United States Patent
Han

(10) Patent No.: US 12,047,289 B2
(45) Date of Patent: Jul. 23, 2024

(54) METHOD OF DETERMINING LOCATION ADDRESSES OF NODE DEVICES IN A NETWORK OF NODE DEVICES AND SUCH A NODE DEVICE

(71) Applicant: SIGNIFY HOLDING B.V., Eindhoven (NL)

(72) Inventor: Mingqian Han, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 74 days.

(21) Appl. No.: 17/789,639

(22) PCT Filed: Dec. 22, 2020

(86) PCT No.: PCT/EP2020/087616
§ 371 (c)(1),
(2) Date: Jun. 28, 2022

(87) PCT Pub. No.: WO2021/136723
PCT Pub. Date: Jul. 8, 2021

(65) Prior Publication Data
US 2023/0047071 A1   Feb. 16, 2023

(30) Foreign Application Priority Data

Jan. 20, 2020 (WO) ................ PCT/CN2020/070151
Apr. 9, 2020 (EP) ..................................... 20168942

(51) Int. Cl.
*H04L 45/74*    (2022.01)
*H04L 45/122*   (2022.01)
*H04L 45/42*    (2022.01)

(52) U.S. Cl.
CPC ............ *H04L 45/74* (2013.01); *H04L 45/122* (2013.01); *H04L 45/42* (2013.01)

(58) Field of Classification Search
CPC ........ H04L 45/42; H04L 45/122; H04L 45/74
(Continued)

(56) References Cited

U.S. PATENT DOCUMENTS

| 10,262,527 B2 | 4/2019 | Benien et al. |
| 2008/0159312 A1* | 7/2008 | Tuononen ............... H04W 8/26 370/401 |

(Continued)

FOREIGN PATENT DOCUMENTS

WO   WO-2004036243 A1 *   4/2004   ........... G01S 13/878

OTHER PUBLICATIONS

Determination of location using RSSI and LQI based on fuzzy logic Sevil Tuncer; Taner Tuncer 2015 23nd Signal Processing and Communications Applications Conference (SIU) (Year: 2015).*

*Primary Examiner* — Ranodhi Serrao

(57) ABSTRACT

A method of and a node device for determining location addresses of node devices (21, 22 . . . 26) of a network (10). The node devices (21, 22 . . . 26) are arranged along an elongated track (12) and geographically distanced from each other by an inter-node distance "d". Each node device (21, 22 . . . 26) comprises a short range communication interface (20). A node device (22) receives a message (27) from an immediate neighbouring node device (21) having a known location address comprised in the message (27). The receiving node device (21) determines its own location address based on the location address received in the message (27). The receiving node device (22) then may transmit a further message (28) comprising its determined location address to a further node device (23), allowing the further node device (23) to determine its location address as well.

14 Claims, 3 Drawing Sheets

(58) Field of Classification Search
USPC .......................................................... 709/238
See application file for complete search history.

(56) References Cited

U.S. PATENT DOCUMENTS

| | | |
|---|---|---|
| 2009/0138336 A1 | 5/2009 | Ashley, Jr et al. |
| 2012/0059622 A1 | 3/2012 | Cacace et al. |
| 2014/0351098 A1* | 11/2014 | Shafer .................. G06Q 10/087 |
| | | 705/28 |
| 2015/0373482 A1 | 12/2015 | Barnard et al. |
| 2017/0124856 A1 | 5/2017 | Benien et al. |
| 2017/0181053 A1 | 6/2017 | Aoun et al. |
| 2017/0200025 A1* | 7/2017 | Shapiro ................. G06F 21/629 |
| 2018/0048529 A1 | 2/2018 | Knibbe et al. |
| 2018/0049257 A1* | 2/2018 | Liu .......................... H04B 5/02 |
| 2018/0054706 A1 | 2/2018 | Kastee et al. |
| 2021/0201333 A1* | 7/2021 | Rachamadugu ........ H04L 67/30 |
| 2021/0289321 A1* | 9/2021 | Verbrugh .............. H04W 4/026 |

* cited by examiner

METHOD OF DETERMINING LOCATION ADDRESSES OF NODE DEVICES IN A NETWORK OF NODE DEVICES AND SUCH A NODE DEVICE

CROSS-REFERENCE TO PRIOR APPLICATIONS

This application is the U.S. National Phase application under 35 U.S.C. § 371 of International Application No. PCT/EP2020/087616, filed on Dec. 22, 2020, which claims the benefit of International Application No. PCT/CN2020/070151, filed on Jan. 2, 2020 and European Patent Application No. 20168942.9, filed on Apr. 9, 2020. These applications are hereby incorporated by reference herein.

TECHNICAL FIELD

The present disclosure generally relates to the field of commissioning of node devices, and, more specifically, to a method of determining location addresses of node devices in a network of operatively interconnected node devices and a node device for operating in a network of node devices.

BACKGROUND

Electric or electronic devices, such as lighting devices and Internet of Things, IoT, devices, and devices supporting enhanced Machine-Type Communication, eMTC, for example, all of which comprise data communication capabilities, are frequently deployed in networks comprised of a plurality of interconnected devices.

These devices, generally called node devices or terminal devices, comprise a short range communication interface, such as a transceiver module, for communication between node devices only, also called inter-node device communication and may comprise a long range communication interface, such as a network adapter or a transceiver module, for data exchange with remote devices, such as a backend device or backend server.

The short range communication interface may operate in accordance with a network protocol for exchanging data by networked devices or nodes, such as designated ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), KNX (and KNX based systems), and proprietary communication technologies and protocols, for example.

The long range communication interface may operate in accordance with a wireless mobile communication standard, such as designated 2G/3G/4G/5G cellular communication, and other long-range wireless communication technologies like Long Range Wide Area Network, LoRaWAN, and Narrowband IoT, NB-IoT, or proprietary communication technologies, and/or a wired data exchange communication technology, for example.

A lighting system, for example, and in particular an outdoor lighting system such as a street lighting system, may comprise a large number of smart light poles connected as a network of node devices. Generally, all smart poles are connected to a backend device, which can manage all functionalities provided by the smart poles by way of various electronic devices installed onto the smart poles, for instance power consumption statistics, pole localization maps, environmental alerts, display content control, etc.

For the smart poles to function properly and get managed by the backend device accurately, the smart poles, after instalment, have to be commissioned or claimed into the network. Before the commissioning, the backend device generally knows Internet Protocol, IP, addresses, and/or identifications, IDs, of the smart poles, but it cannot relate the above information to specific locations of the smart poles. The commissioning of a smart pole allows the backend device to get knowledge of a location of a smart pole, and associate or relate the location to the smart pole identified by its IP or ID. Then the backend can visualize all smart poles on a map, and perform location-aware operations on the smart poles accordingly.

In certain regions of the world, commissioning of smart poles can be done automatically when the smart poles are equipped with localization devices such as a Global Positioning System, GPS, device which can report back geographic coordinates of the smart poles to the backend device during commissioning, for example. However, this method adds extra cost to the smart poles as new hardware is required.

Moreover, it may be prohibited to equip a smart pole with a localization device in some regions of the world. Without supporting a localization service in the smart poles, the commissioning must be done pole by pole manually by an installer on the field. The installer records locations of the smart poles by hand and has the same reported to the backend device via, for example, a public telecommunication network, which takes much extra effort and is error prone.

US2012/0059622A1 discloses a street light monitoring system having a small fraction of the street lights in the system being anchor nodes that are configured to detect and store their own actual fixed position, thereby acting as reference points. Further, the other street lights are referred to as blind nodes and do not have their actual fixed position but can derive their position using the coordinates of the anchor nodes and estimating their distance to them. The distance estimation for any blind node can be performed using a received signal strength indication (RSSI) measured at the respective blind node for small distances of up to a threshold value and a link quantization technique takes advantage of the typical placement of the street lights. Inferred distances between the street lights can be assigned to pre-determined categories of distances for a coarse estimation and further position adjustment to a closest possible "real" position.

Accordingly, there is a genuine need for a method of obtaining location addresses of node devices in a network, in particular for supporting auto-commissioning of node devices configured as a network of interconnected node devices, such as for outdoor or street lighting systems comprising a large number of node devices arranged as smart poles, for example.

SUMMARY

In a first aspect of the present disclosure, there is presented a method of determining location addresses of node devices in a network of operatively interconnected node device, the node devices arranged at different locations along an elongated track and geographically distanced from each other by an inter-node distance, each node device having a unique identifier and comprising a short range communication interface arranged for inter-node communication, the method comprising the steps of:

receiving, by a node device, a message from an immediate neighbouring node device having a known location address along the track, using the short range communication interface, the message comprising the location address of the immediate neighbouring node device;

determining, by the node device, its location address along the track, based on the location address in the received message;

transmitting, by the node device, a further message using the short range communication interface, the further message comprising the determined location address of the node device;

receiving, by a further immediate neighbouring node device of said node device, said further message, using said short range communication interface;

determining, by said further immediate neighbouring node device, its location address along said track, based on said location address in said received further message, and transmitting, by said further immediate neighbouring node device, a message comprising said determined location address of said further immediate neighbouring node device using said short range communication interface.

The present disclosure is based on the insight that a node device in a network of interconnected node devices can determine or calculate its own location address from a known location address of a neighbouring node device. The fact that all node devices are arranged along an elongated track in a sequence or order, and optionally distanced by an inter-node distance, allows the node device to make such a location address determination.

The node device first receives a message from an immediate neighbouring node device, whose location address is already known and comprised in the received message. The node device then proceeds to take the known location address of the immediate neighbouring node device as a reference point or a reference location address for determining its own location address along the track. The determined location address can be a relative location address or definite geographic coordinates along the track, as will be further elucidated below.

The node device then transmits a further message comprising its determined location address. The further message is to be received by a further neighbouring node device and used by the further neighbouring node device to determine its location address in a similar way.

The method of the present disclosure therefore allows location addresses of node devices connected in a network to be determined automatically, eliminating errors caused by manual recording and reporting of location addresses. Moreover, no extra hardware devices such as localization devices are needed, which also helps to save or reduce system costs of the whole network. The determined location address may be used by a remote management device such as a backend server for commissioning purposes and for control or management of the node device accordingly.

In an embodiment of the present disclosure, the determining step is performed by the node device when no location address has been allocated to the node device.

For the purpose of preventing a commissioned node device from trying to determining its location address once again by accidently receiving a message from a neighbouring node device, the node device only tries to determine its location address when it has not been allocated or determined yet. The node device may decide whether it has been allocated a location address by checking local availability of a location address in, for example, a storage device of the node device or presence of a commissioning confirmation message from a backend server.

In an embodiment of the present disclosure, a location address of a node device comprises a string number corresponding to a relative location of the node device in a string of node devices arranged along the track, the determining step comprises successively adapting the string number.

It can be contemplated that relative locations of node devices will suffice, for some applications, to let the backend server perform a required operation and management on the node devices. In this case, a location address of a node device may comprise a string number indicating the relative location of the node device in a string of node devices along the track.

Accordingly, determining the location address of the node device from the known location address of the immediate neighbouring node device comprises successively adapting the serial number to a next one in the string, which will be the serial number of the receiving node device. This is very simple to implement and requires little processing resources.

For example, when 1000 node devices are arranged along a track, numbered consecutively from 1 to 1000, starting from number 1, when receiving at a node device a message indicating a relative location address 595, for example, the receiving node device determines its location address by adapting the received location address to 596, etc. It will be appreciated that the term 'number' or 'string number' may include a position in string of numerical characters and/or alphabetical and alphanumerical characters, wherein the adaptation comprises calculating a next position in the string.

In an embodiment of the present disclosure, a location address of a node device comprises geographic coordinates of the node device, the message further comprises the inter-node distance and a geographic direction of the track, the determining step comprises calculating geographic coordinates of the node device from the geographic coordinates of the immediate neighbouring node device, the inter-node distance and the geographic direction of the track.

In practice, it may be necessary to know precise geographic locations, that is, geographic coordinates, of the node devices along the elongated track, which means a location address of a node device comprises or is expressed in geographic coordinates. To calculate the geographic coordinates of the node device from the geographic coordinates of the immediate neighbouring node device, the inter-node distance geographic and a geographic direction of the track have to be used as well.

For a street lighting system, considering that the inter-node distance is relatively small compared to dimensions of the globe, the calculation may be simplified to an arithmetic addition or subtraction of geographic coordinates along the geographic direction of the track, or the use of trigonometric functions. Such calculations are also relatively straightforward and do not require many or specific resources to process.

The calculated geographic coordinates of the node device may be used to provide an accurate indication as to the location where the node device is located geographically, such that location-related operations, requiring precise knowledge of the geographic coordinates of the node device, can be performed.

In an embodiment of the present disclosure, the message comprises number information related to a number of node devices whose locations have to be determined, wherein when determining its location address, the number information is adapted by the node device to indicate a number of node devices whose locations have to be determined less one, and wherein transmission of the further message is terminated if the number information indicates that there are no further node devices whose locations have to be determined.

Number information related to a number of node devices whose location addresses have to be determined allows the node device receiving the message to determine if it is the last node device to have its location determined by adapting the number information to a next in line. In the case that there are still other node devices whose locations have to be determined, the node device, now having its location address determined already, will transmit the further message comprising the determined location address of the node device, allowing a next neighbouring node device to determine its location accordingly. Otherwise, the wherein transmission of the further message is terminated.

In an embodiment of the present disclosure, the number information is a range of numerical, alphabetical and alphanumerical characters, wherein the adaptation comprises calculating a next position of the range.

It can be contemplated that the number information that represents the number of node devices to have their location addresses determined may be expressed in a variety of ways. The simplest one is a range or series of numerals, but more complicated ones such as alphabetical and alphanumerical characters may also be used. The number information may be used following an incremented or decremented order, as long as it can be adapted to indicate how many node devices remain to have their location addresses determined. Accordingly, the adaption comprises calculating or finding a next position in the range, which indicates that there is one fewer node device needing determining its location address.

When the number information indicates that there is no further node device needing determining its location address, no further message is transmitted. In this way, transmitting messages to node devices whose location addresses are already determined is effectively prevented.

In an embodiment of the present disclosure, a node device at one end of the elongated track is selected as a starting node device by allocating a location address to the selected node device.

To make it easier to implement the method, one node device, in particular a node device at an end of the elongated track, is first commissioned manually, before location addresses of other node devices are determined automatically in accordance with the present disclosure as elucidated above. The manual commissioning of the starting node device may comprise setting or allocating geographic coordinates or a relative location string number to the starting node device. Optionally, a geographic direction of the track, and the inter-node distance may also be configured to the starting node device manually at this point of time.

The location address of the starting node device may be then used to determine a location address along the track of a next neighbouring node device.

Manual commissioning of only one node device requires much less effort compared to manual commissioning of more than 1000 or even 10,000 node devices in a practical application, and can be accurately controlled to avoid errors much more easily than manually commissioning a large number of node devices.

In a particular embodiment of the present disclosure, the method comprises including the number information in a message at the starting node device.

This is to ensure that the number information has a correct initial value indicating the number of node devices in the network which have to determine their location addresses, and get commissioned accordingly. With the determination of the location address of each node device following the starting node device, the number information is adapted accordingly, to a next position in the range of numerical, alphabetical and alphanumerical characters. The number information remains up-to-date, always reflecting the node devices whose location addresses have to be determined.

In an embodiment of the present disclosure, the method further comprises the step of reporting, by a node device, its location address and unique identifier to a backend server.

Each and every node device, after getting to know its location address, can report the location address together with its unique identifier to the backend server, such that the backend server can commission the node device in the network, by relating or associating the location address of the node device to, for example, an IP address of the node device. This commissioning ensures all node devices are managed correctly by the backend server.

In an embodiment of the present disclosure, the reporting step by the node device is performed in response to determining its location address. Alternatively, the reporting step by the node device is performed in response to an inquiry by the backend server.

It can be contemplated that a node device can report the determined location address to the backend server right after the determination, allowing the backend server to commission the node device in the network. In this way, the backend server may recognize node devices not properly commissioned by failing to receive any report from such node devices.

Alternatively, the backend sever may send an inquiry message to the node devices, to collect the determined location addresses of the node devices. This can be done as a collective step, with an improved efficiency.

In an embodiment of the present disclosure, the node device switches off its short range communication interface after transmitting the further message.

As a measure of ensuing that the message is always received by a neighbouring node device with no allocated location address, the node device can switch its short range communication interface off, for example, per instruction from the backend server or on its own initiative, after its location address becomes known to the backend server and transmitting the further message comprising the determined location address. This helps to prevent unintentionally modification of the location address of the node device.

A second aspect of the present disclosure provides a node device arranged for operating in a network of operatively interconnected node devices, the node devices arranged at different locations along an elongated track and geographically distanced from each other by an inter-node distance, the node device having a unique identifier and comprising a short range communication interface arranged for inter-node communication, the node device comprising a processor and arranged for operating in accordance with the method of the first aspect of the present disclosure.

The node device of the present disclosure can determine its location address automatically, with reference to a known location address of an immediate neighbouring node device and following the method of the present disclosure.

In an embodiment of the present disclosure, the short range communication interface comprises one of a camera and a display combination and/or a wired and/or wireless communication interface, or equivalent.

Some node devices, in particular smart poles, may be equipped with IoT devices such as high resolution cameras and displays. The cameras and displays together may be used as the short range communication interfaces for transmitting and receiving of messages comprising location addresses of node devices. As an example, the immediate neighbouring node device can have an image, such as a Quick Response, QR, code having the message embedded therein displayed on its display, such that the node device can scan and capture the QR code using its camera to extract the message.

Having the message received in this way does not involve extra communication cost, which also helps to save radio resources needed for communication.

Alternatively, the short range communication interface comprises a wireless communication interface, The message is therefore transmitted over a wireless communication channel between the node device and the immediate neighbouring node device.

It can be contemplated that currently available wireless communication interfaces can be readily used for exchanging the message between the node device and the immediate neighbouring node device. In this case, a communication channel is established between the two node devices and the message is transmitted according to respective wireless transmission protocols.

In particular, as an example, the wireless communication interface is one of a cellular communication interface, a light fidelity interface, and a Bluetooth interface, the received message is transmitted with a signal strength arranged for having the message received solely by the node device.

As the message is meant to be received by only the node device from the immediate neighbouring node device, the transmission is performed use a certain power level and signal strength to ensure that only the node device can receive the message. This ensures the message is always transmitted to the closest node device along the track, allowing a correct reference location address, that is, the known location address of the immediate neighbouring node device to be used to determine the location address of the node device.

A third aspect of the present disclosure comprises an electric or electronic device, such as a smart light pole comprising at least one node device of the second aspect of the present disclosure.

A fourth aspect of the present disclosure comprises a computer program product, comprising a computer readable storage medium storing instructions which, when executed on at least one processor, cause the at least one processor to carry out the above method of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

The present disclosure is detailed below with reference to a network having operatively interconnected smart light poles operating as node devices of the network. Those skilled in the art will appreciate that the present disclosure is not limited to the network of light poles, but is applicable for networks of a wide variety of node devices enabled with network communication connectivity, as indicated in the background part.

Each node device is configured with a short range communication interface. The short range communication interface may operate in accordance with a network protocol for exchanging data by networked devices or nodes, such as designated ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), KNX (and KNX based systems), and proprietary communication technologies and protocols, either wireless or wired, for example. The short range communication interface typically operates for data exchange between node devices in the network, either in a broadcast, narrowcast or unicast communication mode.

As elucidated above, the short range communication interface may be comprised by a high resolution camera and display at the node devices. These cameras and displays together may be used for transmitting and receiving messages comprising location addresses of node devices.

Some or all node devices may also be equipped with a long range communication interface that is arranged for communicating with a backend server, which is also configured with a long range communication interface. The long range communication interface typically operates according to a mobile communication system technology in a licensed frequency band, such as 2G/3G/4G/5G cellular communication, and other long-range wireless communication technologies, such as known as Long Range Wide Area Network, LoRaWAN, and Narrowband IoT, NB-IoT, communication, for example. However, the long range communication interface may also operate according to a proprietary wireless communication protocol or technology and/or a wired data exchange communication technology.

Figure 1:
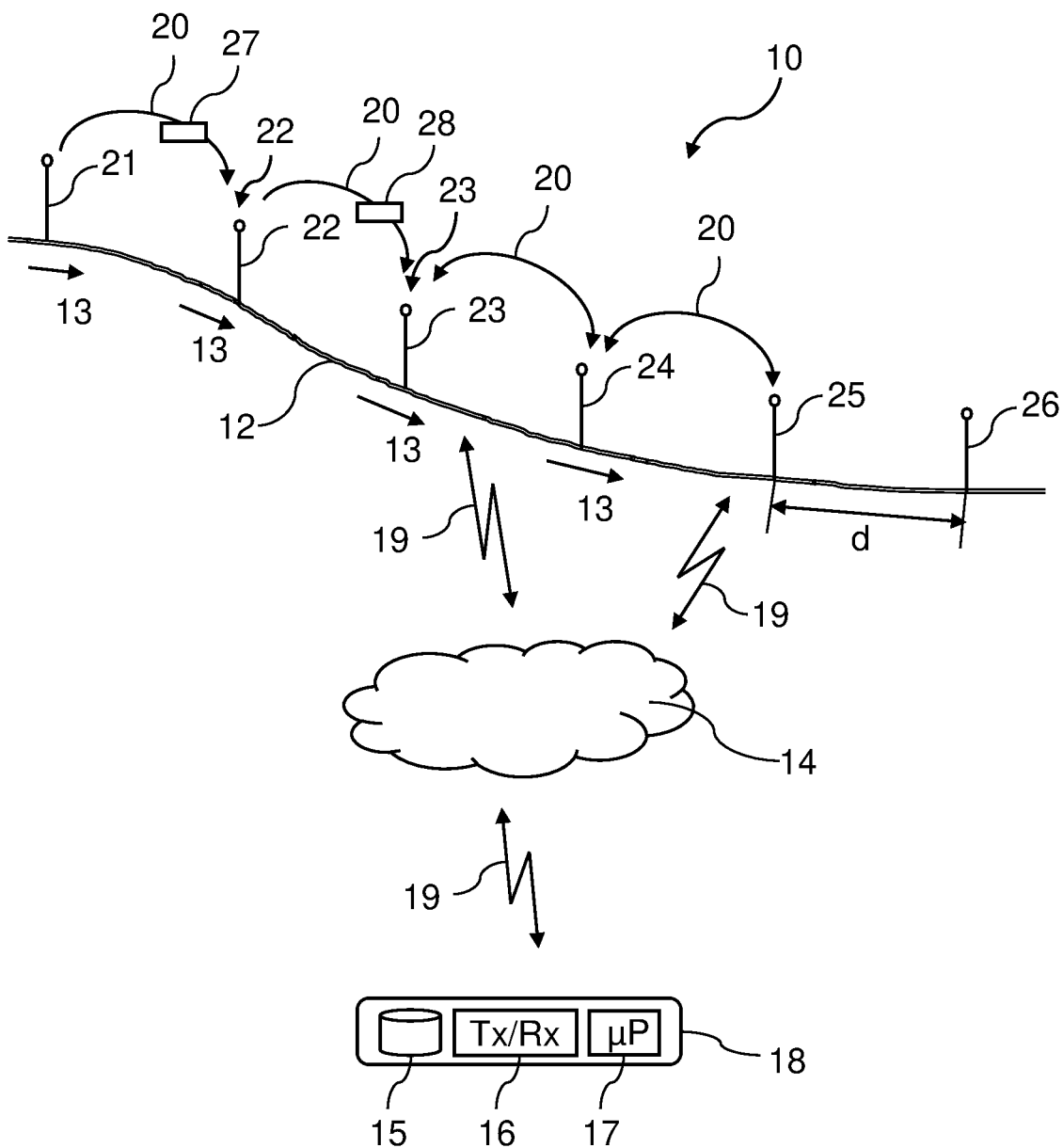
FIG. 1 schematically illustrates a network of node devices arranged as smart light poles installed along an elongated track in accordance with an embodiment of the present disclosure.

FIG. 1 schematically illustrates a network 10 of node devices arranged as smart light poles installed along an elongated straight and/or winding track 12 in accordance with an embodiment of the present disclosure.

The smart poles 21, 22 . . . 26 are installed, for example as a construction project, along the elongated track 12, which can be a highway, a street, a road or a path in an urban or suburb environment. The elongated track 12 is geographically pre-defined according to a construction plan or installation plan indicating a geographic route comprising geographic directions 13 along each part of the track 12. The smart poles 21, 22 . . . 26 are equally distanced from each other by an inter-node distance, such as a geographic distance "d" for example.

The smart light poles 21, 22 . . . 26 may also be installed on more than one tracks 12 (not shown), in that case, smart poles 21, 22 . . . 26 along each track may be handled according to the method of the present disclosure independently.

Some or all of the smart poles 21, 22 . . . 26 may be connected by a long-range communication interface 19 to a backend server 18 via a network 14, such as Internet 14. The backend server 18 comprises a memory or repository 15, storing project local network data including for example Internet Protocol, IP, addresses allocated by the backend server 18 to the smart poles 21, 22 . . . 26. The backend server 18 further comprises a transceiver 16 for exchanging data with the smart poles 21, 22 . . . 26 using the long-range communication interface 19 and the Internet 14, and operates a process or application 17 for remotely managing and operating the smart poles 21, 22 . . . 26.

For the purpose of the present disclosure, it is assumed that each smart light pole 21, 22 . . . 26, after installation and powered up for the first time, is assigned a unique network identifier, NID, such as an IP address dynamically allocated via Dynamic Host Configuration Protocol, DHCP, service, by the backend server 18, for example.

A smart light pole 21, 22 . . . 26 may report its unique identifier, such as a Media Access Control, MAC, address or a serial number, SN, assigned by the manufacturer, to the backend server 18. The backend server 18 can manage and operate all functionalities of each smart pole 21, 22 . . . 26, including for example, power consumption statistics, pole localization maps, environmental alerts, display content control. Some operations require that location addresses of the node devices 21, 22 . . . 26 along the track 12 are known to the backend server 18.

The method according to the present disclosure allows node devices, that is, the smart poles 21, 22 . . . 26, to determine their location addresses and report the same to the backend server 18, such that the backend server 18 can commission and add the node devices including their location address to the network 10 and thereafter manage and control the smart poles 21, 22 . . . 26.

Figure 2:
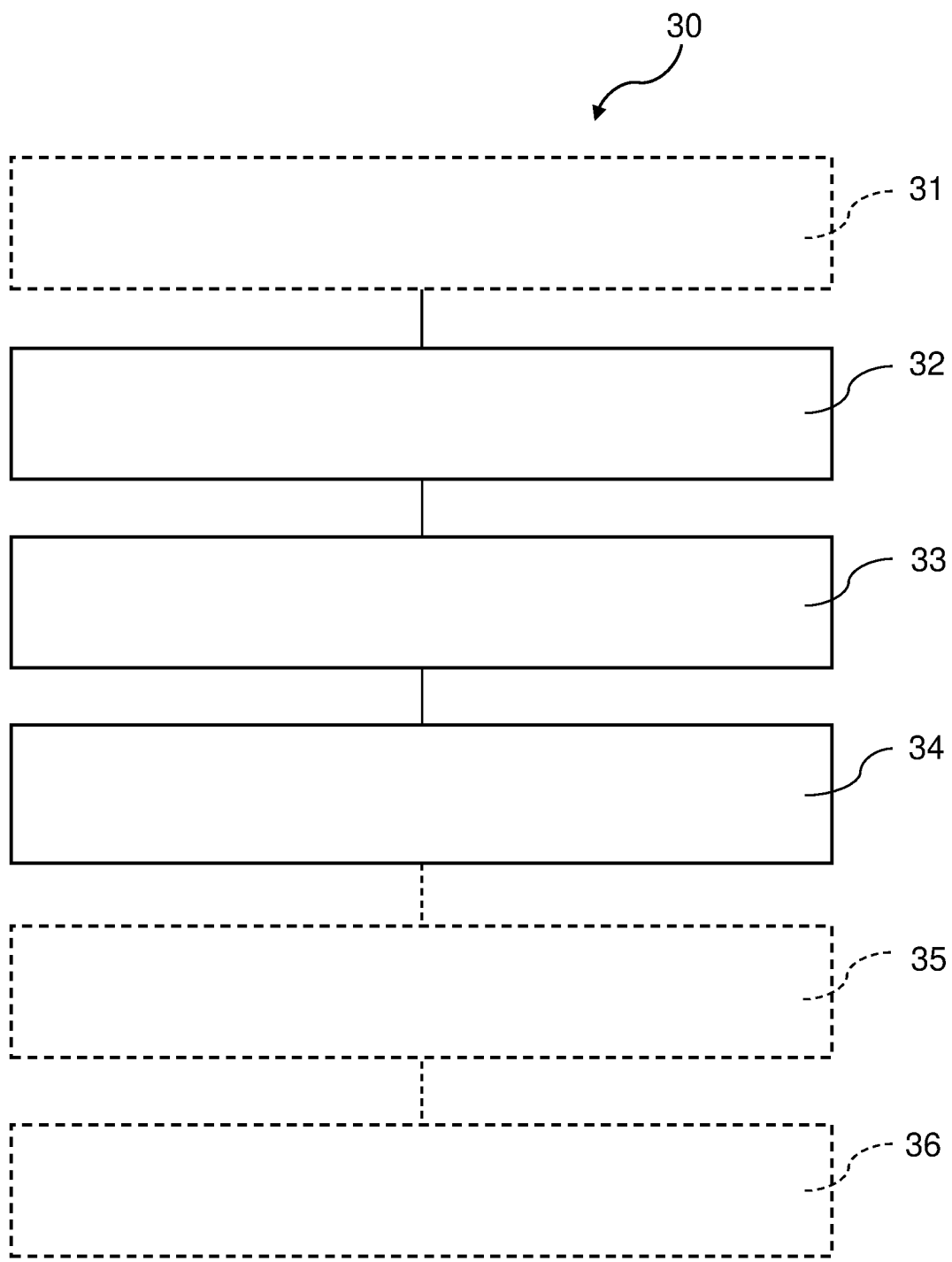
FIG. 2 illustrates, in a simplified flow diagram, steps of determining locations of node devices of a network of operatively interconnected node, in accordance with an embodiment of the present disclosure.

FIG. 2 illustrates, in a simplified flow diagram 30, steps of determining location addresses of node devices of a network of operatively interconnected smart poles, in accordance with an embodiment of the present disclosure.

As a preparatory step, all smart poles 21, 22 . . . 26 have their short range communication interfaces 20, in particular a receiver, such as a radio receiver, a light fidelity, Li-Fi, receiver, or a camera, switched on and tuned such that the smart poles 21, 22 . . . 26 can receive messages from neighbouring smart poles 21, 22 . . . 26. For example, such that only messages at a Radio Signal Strength Indicator, RSSI, level above a set threshold are received, or receiving an optical image at particular light level permitting error free decoding of a code projected at a display of a neighbouring node device, for example.

At step 31, "Commissioning a starting node device manually by setting location address of the starting node device", a node device, such as the leftmost smart light pole 21, at an end of the elongated track 12, which may also be referred to as a starting pole 21, or an initializer pole 21, is commissioned manually, for example by an installer or a field engineer.

The manual commissioning configures a location address of the initializer pole 21, which can be geographic coordinates of the pole, or a relative location such as a string number corresponding to a relative location of a smart pole in a string or queue along the track 12. The configured or allocated location address is transmitted to the backend server 18, allowing the backend server to associate the location address to an IP or ID of the starting node device 21 and thereby have the starting node device 21 commissioned.

The inter-node distance "d" may be configured to the starting node device 21 already during the manual commissioning. Alternatively, the inter-node distance "d" may also be transmitted from the backend server 18 to all smart poles, when the smart poles power up for the first time, or at a later stage in response to a request from a smart pole, for example.

The initializer pole 21 may also receive a geographic direction of the track 12 from the installer and have the same stored locally at the node device. During the commissioning of the initializer pole 21, number information related to a total number of poles of the project or installation to be commissioned may be received by the initializer pole 21, which may be used for determining a number of smart poles 22 . . . 26 whose locations are still to be obtained during the commissioning in accordance with the present disclosure.

The number formation may be expressed in a variety of ways, for example as a series of numerical, or alphabetical, or alphanumerical characters.

A simple and straightforward example of the number information may be a number indicating the total number of poles. As an example, for an installation project with 1000 light poles, the number information assigned at the initializer pole 21 may be 1000.

Alternatively, the number information may comprise a series of numerical of 1, 2, 3, . . . , 1000, or a serial of alphanumerical A1, A2, A3, . . . , A1000, or any other series indicative that there are totally 1000 node devices to be commissioned, that is, to have their location addresses determined, in accordance with the method of the present disclosure.

The above number information may be used following an incremented or decremented order, as long as it can be adapted to indicate how many node devices remain to have their location addresses determined. The above configuration information may be stored in a storage device of the starting pole 21.

At step 32, "Receiving by node device a message from immediate neighbouring node device having a known location address", a smart pole, such as the smart pole 22 immediately next to the initializer pole 21 receives a message 27 transmitted by the initializer pole 21, using their short-range communication interfaces 20.

In the case that the short range communication interfaces 20 of the smart poles comprise a camera and a display, the initializer pole 21 can switch on its display just before this step so that an image, such as a Quick Response, QR, code comprising the message may be displayed on the display of the initializer pole 21, only allowing the smart pole 22 immediate next to the initializer pole 21, hereafter referred to as a target pole or target node device, to scan the displayed image using its camera.

The short range communication interface 20 may also comprise a wireless communication interface, as mentioned above. In this case, the message 27 is transmitted from the initializer pole 21 to the target pole 22 over a communication channel established between the poles 21, 22.

For wireless transmission of the message 27, it is noted that the message is transmitted by a smart pole with a signal strength that allows the message to be received only by the a smart pole immediate next to the transmitting pole.

The message may be a ZigBee inter-pan message, when a ZigBee interface is used, for example. Alternatively, the message may be a Li-Fi message, when a Li-Fi interface is used.

The message 27 comprises the location address of the initializer pole 21 and optionally the number information related to a number of node devices whose location addresses have to be determined.

The receiving node device has to adapt the number information in the message, because the location address of the initializer pole is already configured and reported to the backend server 18. Adaptation of the number information may comprise calculating or finding a next position of the string or series, which indicates that there is one less node device needing determining its location address.

In the above example of a project having 1000 smart poles, with the number information expressed simply by the number 1000, the adaptation is reducing 1000 by one, that is, to adapt the number information to 999, to indicate that there are now 999 smart poles whose location addresses remain to be determined.

In the case that the number information comprises a series of numerical, alphabetical, or alphanumerical characters, the adaption may comprise finding a next position of the series, such as from A99 to A100, for example.

Optionally, the message 27 may also comprise the geographic direction 13 of the track 12. The track extending directions along the whole track 12 may be transmitted in the message 27, for example. On the other hand, the message 27 may include only geographic directions of the part of track 12 covering the target node device, trying to decide on its location address and node devices in its neighbourhood.

It is also possible to obtain the geographic direction 13 directly from the backend server 18 by sending a request message from a node device 21, 22 . . . 26 to the backend server 18.

The inter-node distance "d" may also be optionally comprised in the received message 27. Alternatively, the inter-node distance "d" can also be obtained from the backend server 18 by sending a request message or the like.

Next, at step 33, "Determining by node device its location address based on location address in received message, when no location address has been allocated to the node device", the target node device, that is, the target smart pole 22 which is immediate next to the initializer pole 21, determines its location address, by using the received location address of the initializer pole 21 as a reference location address, only when the location address of the receiving node device 22 has not been allocated or determined yet.

A node device may determine whether a location address has been allocated to it by checking local availability of a location address in, for example, a storage device of the node device or presence of a commission confirmation message from a backend server or equivalent. When a location address has been allocated, the node device knows that a message received from a direct neighbouring node device need not to be processed. That is the smart pole will not try to determine or calculate its location for a second time, as this is not needed anymore.

It may not be always necessary to know the precise geographic coordinates of the smart poles. Actually, knowing their relative locations, which are expressed for example as a string of numbers for respective node devices along the track 12, may be sufficient for some applications. In this case, the determination of the location address of the target pole may comprise successively adapting the received string number.

As an example, if the starting pole is assigned a serial number of 1, the target pole being the one pole immediate next to the starting pole, can determine that its relative location is indicated with a serial number of 2, etcetera.

In the case that location addresses of smart poles are expressed in geographic coordinates, the target smart pole 22 calculates its location address, that is, its geographic coordinates, using the known location address of the initializer pole 21, the inter-node distance "d" and the geographic direction 13 of the track 12.

It can be contemplated that derivation of the geographic coordinates of the target pole from the geographic coordinates of the initializer pole, the geographic direction of the track and the inter-node geographic distance can be performed in a number of ways known to those skilled in the art, which need not be elaborated here.

The calculated geographic coordinates of the target node device may be used to provide an accurate or actual indication as to where the target node device is located geographically, such that location-related operations, for example replacing a faulty lighting device installed on the smart pole by an unmanned aerial vehicle, UAV, can be performed.

Following that, at step 34, "Transmitting a further message comprising determined location address by the node device", the target pole 22 now acts as an initializer pole and transmits the further message 28 comprising its determined location address, thereby allowing a neighbouring pole, i.e. pole 23 immediately next to it, which is now a target pole, to determine its location address accordingly. The current target pole 23 may obtain or determine its own location according to the above steps 32 and 33.

Before transmitting the further message, the target pole can check if it is the last pole whose location address has to be decided by referring to the number information in the received message. If it is the last pole, it does not transmit the further message 28.

Steps 32 and 33 may be performed repeatedly, until location addresses of all smart poles in the network are determined.

At step 35, "Reporting by a node device its location address to the backend server", which can be performed by each smart pole after same has determined its location address, or at a later point in time when location addresses of a number of smart poles or all smart poles are determined, the location address of a smart pole 21, 22 . . . 26 is reported to the backend server 18, such that the backend server 18 can associate or relate the location address of the smart pole to its unique identifier, such as an IP address or an ID of the smart pole, thereby commissioning the smart pole into the network system 10.

The reporting of the location address may also be performed in response to an inquiry message sent to the node devices 21, 22 . . . 26 by the backend server 18 for collecting the determined location addresses of the node devices. This can be done as a collective step, thereby improving efficiency.

After successfully commissioning of each smart pole 21, 22 . . . 26, the backend server 18 may send a confirmation message to the smart pole informing the smart pole that it is commissioned into the network.

At step 36, "Switching off short range communication interface by the node device", the backend server 18 may send an instruction to a smart pole which is already commissioned, requesting that smart pole to switch off its short range communication interface 20, such that the commissioned smart pole will not receive a message from a direct neighbouring smart pole and will try to determine or calculate its location for a second time, as this is not needed anymore. By having the short-range communication interface switched off, or at least disabled for communication purposes, transmission of messages to commissioned smart poles in a backward direction along the track, i.e. in the direction of the starting or initializer device is effectively prevented.

Alternatively, the smart pole having its location address determined may voluntarily switch off its short range communication interface after transmitting the further message 28.

Figure 3:
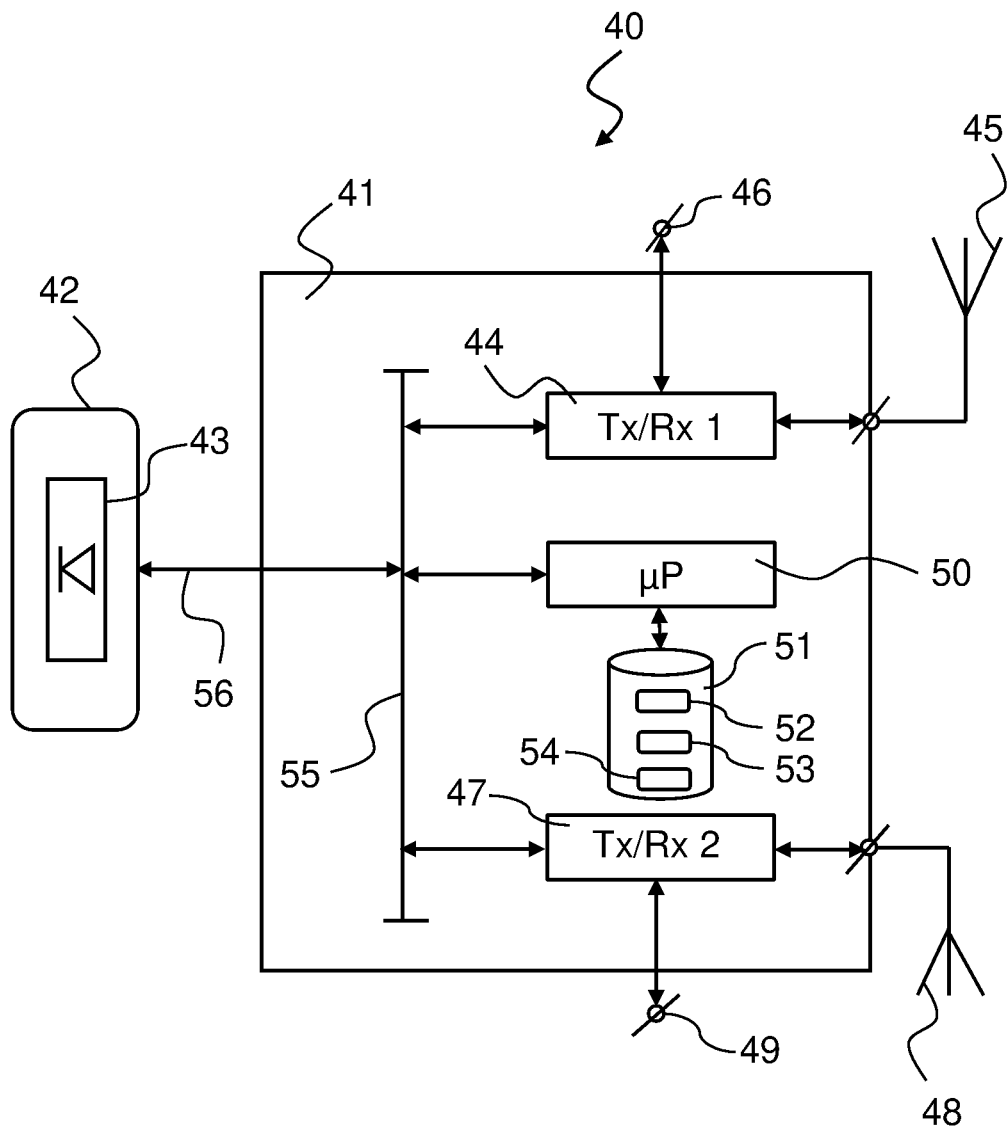
FIG. 3 schematically illustrates an embodiment of a node device or terminal device arranged for operating in a network of operatively interconnected node devices, in accordance with the present disclosure.

FIG. 3 illustrates, schematically, a diagram of an embodiment of a node device or terminal device 40 arranged for operating in a network of operatively interconnected node devices, in accordance with the present disclosure.

The node device 40 comprises a control part or control device 41 and a load such as a lighting fixture or lighting device 42, comprising a lighting module 43, preferably a Light Emitting Diode, LED, lighting module or a plurality of LED lighting modules, operation of which may be controlled by the control device 41 from or through a remote control device, such as a remote or backend server (not shown), for example.

The control device 41 operates a short range communication interface 47, such as a second network adapter or transceiver, Tx/Rx 2, module arranged for short-range wireless 48 or wired 49 exchange of messages or data packets with another node device in the network, i.e. so called inter-node device communication. Network protocols for exchanging data by networked devices or nodes may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols. As mentioned above, an optical camera and optical display may comprise the short range communication interface 47.

The control device 41 may further operate a long range communication interface 44, such as a first network adaptor or a transceiver, Tx/Rx 1, module, arranged for direct wireless message exchange or data packets 45 with a remote control device or backend server. The long range communication interface 44 typically operates according to a mobile communication system technology in a licensed frequency band, such as 2G/3G/4G/5G cellular communication, and other long-range wireless communication technologies, such as known as Long Range Wide Area Network, LoRaWAN, and Narrowband IoT, NB-IoT, communication, for example. However, the long range communication interface 44 may also operate according to a proprietary wireless communication protocol or technology.

The expression 'direct wireless message exchange' refers to downlink, DL, exchange of data via the long range communication interface 44 over a wireless communication channel from a remote server to the node device 40, and uplink, UL, exchange of data via the long range communication interface 44 from the node device 40 to the remote server, or the like.

The long range communication interface 44 may be arranged for wired message exchange 46, such as for data exchange over an Ethernet connection and the Internet, or the like.

The control device 41 further comprises at least one microprocessor, μP, or controller 50, and at least one data repository or storage or memory 51, among others for storing operational software for example project local network data 52 for commissioning node devices of a network, computer program code instructions for operating the node device in accordance with the present disclosure, address information 53 of the node device itself and other node devices, such as identifiers 54, IDs, Media Access Control, MAC, addresses and subscriber information of node devices. Instead of the repository 51, a separate memory or storage accessible to the at least one processor or controller 50 may be provided.

The at least one microprocessor or controller 50 communicatively interacts with and controls the long range communication interface 44, the short range communication interface 47, and the at least one repository or storage 51 via an internal data communication and control bus 55 of the control device 41. The long 44 and short range communication interface 47 may be arranged for transferring/forwarding messages and data, such as an inter-node distance, geographic directions of a track, a location address of a neighbouring node device, number information related to a number of node devices whose location addresses have to be determined, needed for determining the location addresses of the node devices.

The lighting fixture or lighting device 42 connects 56 to and is controlled from the data communication and control bus 55 by the at least one microprocessor or controller 50.

Those skilled in the art will appreciate that any electric load may be connected 56 to the control bus other than or in addition to a lighting fixture or lighting device 42, such as motor loads and (environmental) sensors of different type and/or measuring equipment, and the like.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of determining location addresses of node devices in a network of operatively interconnected node devices, said node devices arranged at different locations along an elongated track and geographically distanced from each other by an inter-node distance, each node device having a unique identifier and comprising a short range communication interface arranged for inter-node communication, said method comprising the steps of:

receiving, by a node device, a message from an immediate neighbouring node device having a known location address along said track, using said short range communication interface, said message comprising said location address of said immediate neighbouring node device;

determining, by said node device, its location address along said track, based on said location address in said received message;

transmitting, by said node device, a further message using said short range communication interface, said further message comprising said determined location address of said node device;

receiving, by a further immediate neighbouring node device of said node device, said further message, using said short range communication interface;

determining, by said further immediate neighbouring node device, its location address along said track, based on said location address in said received further message, and transmitting, by said further immediate neighbouring node device, a message comprising said determined location address of said further immediate neighbouring node device using said short range communication interface;

wherein a location address of a node device comprises a string number corresponding to a relative location of said node device along said track, said determining step comprises successively adapting said string number.

2. The method according to claim 1, wherein said determining step is performed by said node device when no location address has been allocated to said node device.

3. The method according to claim 1, wherein a location address of a node device comprises geographic coordinates of said node device, said message further comprises said inter-node distance and a geographic direction of said track, said determining step comprises calculating geographic coordinates of said node device from said geographic coordinates of said immediate neighbouring node device, said inter-node distance and said geographic direction of said track.

4. The method according to claim 1, wherein said message comprises number information related to a number of node devices whose locations have to be determined, wherein when determining its location address, said number information is adapted by said node device to indicate a number of node devices whose locations have to be determined less one, and wherein transmission of said further message is terminated if said number information indicates that there are no further node devices whose locations have to be determined.

5. The method according to claim 4, wherein said number information comprises a range of numerical, alphabetical and alphanumerical characters, wherein said adaptation comprises calculating a next position of said range.

6. The method according to claim 1, wherein a node device at one end of said elongated track is selected as a starting node device by allocating a location address to said selected node device.

7. The method according to claim 6, further comprising including said number information in a message at said starting node device.

8. The method according to claim 1, further comprising the step of reporting, by a node device, its location address and unique identifier to a backend server.

9. The method according to claim 8, wherein said reporting step by said node device is performed in response to one of determining its location address and an inquiry by said backend server.

10. The method according to claim 1, wherein said node device switches off its short range communication interface after transmitting said further message.

11. A node device, arranged for operating in a network of operatively interconnected node devices, said node devices arranged at different locations along an elongated track and geographically distanced from each other by an inter-node distance, said node device having a unique identifier and comprising a short range communication interface arranged for inter-node communication, said node device comprising a processor and arranged for operating in accordance with the method of claim 1.

12. The node device according to a claim 11, wherein said short range communication interface comprises one of a camera and a display combination, a wired and a wireless communication interface.

13. An electric or electronic device, such as a smart light pole, comprising at least one node device according to claim 11.

14. A non-transitory computer readable medium comprising computer program code which, when executed on at least one processor, cause said at least one processor to carry out the method according to claim 1.

* * * * *